Aug. 27, 1946.  T. G. HÖGLUND ET AL  2,406,687
SOOT BLOWER
Filed Sept. 23, 1943  2 Sheets-Sheet 1
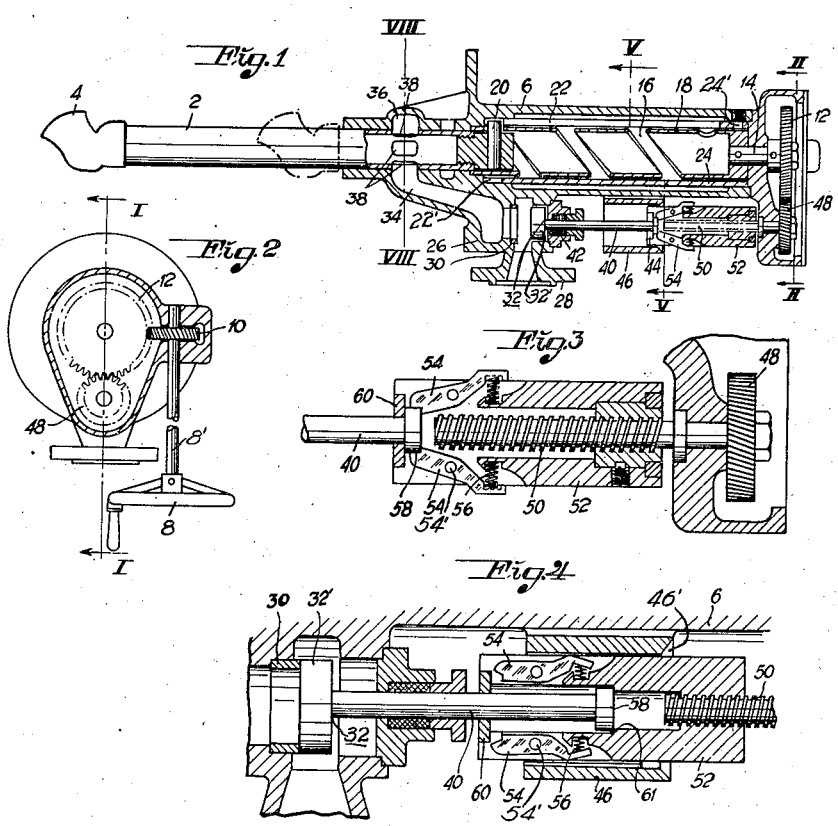

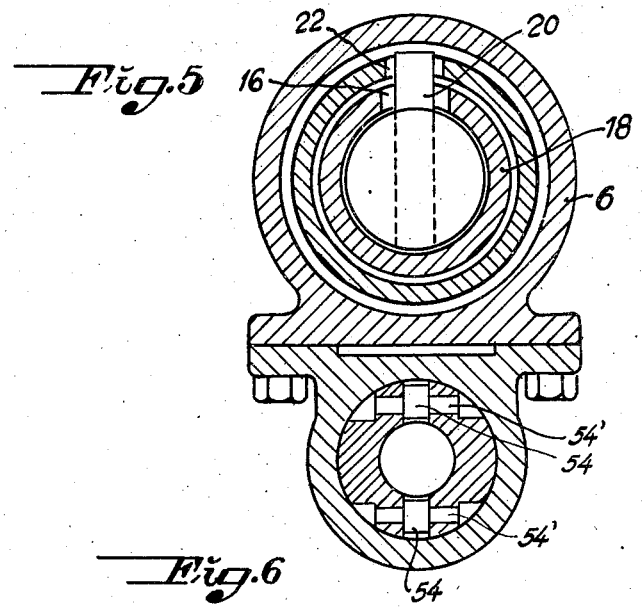
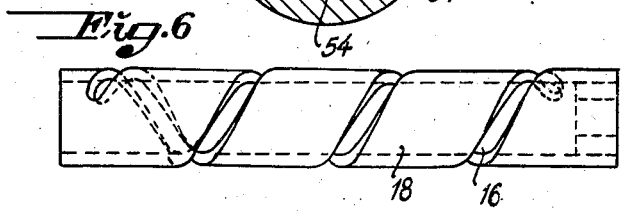
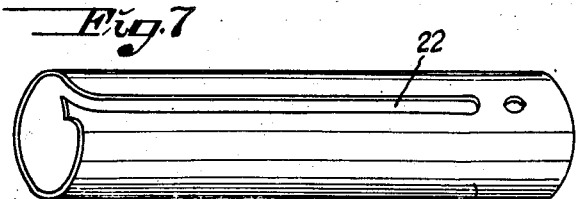
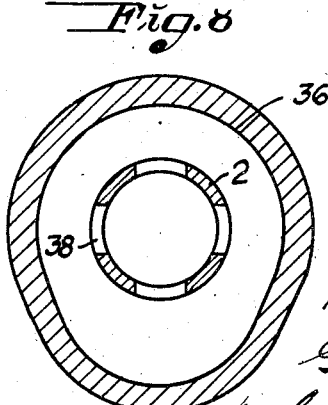

Patented Aug. 27, 1946

2,406,687

UNITED STATES PATENT OFFICE 2,406,687

SOOT BLOWER

Thure Gustaf Höglund and Gustav Emanuel Leijon, Stockholm, Sweden, assignors to Aktiebolaget Superior, Stockholm, Sweden, a corporation of Sweden Application September 23, 1943, Serial No. 503,506
In Sweden October 13, 1942

6 Claims. (Cl. 15—104.055)

The present invention relates to such soot blowers which consist of an apparatus casing adapted to receive a gaseous cleaning fluid (steam, pressure air) and of a nozzle tube movable relatively to said casing and adapted to be actuated by an operating mechanism by which the cleaning fluid is blown toward the surfaces to be cleaned. In some apparatus of this type the operating mechanism is constructed to effect the axial displacement of the nozzle tube between an inoperative position and an operative position as well as a rotation of the nozzle in the latter position. The nozzle of the tube is so directed that the cleaning fluid coming therefrom sweeps over a predetermined section of the heat surfaces in the steam generator or the like to be cleaned.

One object of the invention is to provide means for coordination of the axial movements as well as the rotation of the nozzle tube with the movements of the member which controls the supply of cleaning fluid to the nozzle tube.

A further object is to provide means controlling the supply of the cleaning fluid so as to prevent cleaning fluid from being exhausted too soon when the nozzle tube is moved from an inoperative position in which it is retracted in a channel in the walling of the steam generator to its operative position. In this connection the invention aims at constructing the soot blower so that said controlling means prevents the interruption of the supply of cleaning fluid too late. By such control, attack of the heated cleaning fluid on the brick work of the steam generator can be prevented.

A still further object is to provide means for moving a valve controlling the supply of cleaning fluid positively during the setting of said valve, and to provide means for interrupting the connection between the operating mechanism and the valve at the end of the closing movement thereof whereby the final closing of the valve may be effected by the pressure of the cleaning fluid.

The invention also has for its object to provide means for keeping the valve controlling the supply of cleaning fluid to the nozzle tube reliably in its closed position to prevent opening of the valve as a result of vacuum arising in the fluid supply conduit.

Another object of the invention is to provide an advantageous construction of the connection transmitting motion from the operating mechanism to the valve controlling the supply of cleaning fluid.

In the accompanying drawing a soot blower embodying the invention is illustrated by way of example. Fig. 1 is a longitudinal section of the complete apparatus; Fig. 2 is a cross-sectional view on line II—II in Fig. 1; Fig. 3 illustrates, on an enlarged scale, an axial section of the motion transmitting connection when the valve is open; Fig. 4 illustrates in a similar manner a modified embodiment of the connection when the valve is closed. Fig. 5 is a transverse section substantially on the line V—V of Fig. 1. Fig. 6 is an elevation of a sleeve included in the driving means for the nozzle tube. Fig. 7 is a perspective view of a further sleeve of the driving means, and Fig. 8 is a transverse section on the line VIII—VIII of Fig. 1.

The nozzle tube 2 with the nozzle 4 is axially displaceable in a casing 6 between an operative position and an inoperative position, the latter being indicated in Figure 1 by a dotted line showing of the nozzle. The displacement between these positions may be effected by any suitable operating mechanism, if only this mechanism is constructed so as to enable also rotation of the nozzle in its operative position. According to the invention the operating mechanism comprises a hand-wheel 8 mounted on the lower end of a shaft 8', the upper end of the shaft carrying a worm gear 10 meshing with a further worm-gear 12 which is secured to a shaft 14 mounted in the outer end of the casing 6. Mounted on the inner end of the shaft 14 is a sleeve 18 comprising a helical groove 16 and adapted to be rotated on rotation of the hand-wheel when the apparatus is operated. A pin 20 fixed into the inner closed end of the nozzle tube fits slidably into the groove 16 and is of such a length that it reaches into a linear axial groove 22 formed by a slot in the wall of a tubular lining 24 and which is non-rotatably mounted in the casing 6. As long as the end of the pin 20 is situated in the axial groove 22, the nozzle tube is prevented from rotating but is displaced axially under the influence of the helical groove in the sleeve 18 upon the rotation of the latter. At the end of the displacement of the nozzle tube to the operative position, the end of the pin 20 slides out of the axial groove 22, and thereafter the tube 2 is brought along upon the rotation of the sleeve 18 and the end of the pin 22 passes along a circular groove at the end of the sleeve 24.

The casing 6 is also provided with a valve 32 comprising a housing 26 having a flanged inlet socket 28, a valve seat 30 and a valve 32 for controlling the supply of the cleaning fluid to the nozzle tube. The valve 32 has a valve head 32' arranged to be moved into and out of engagement with the valve seat 30. The valve housing is connected with a chamber 36 surrounding the nozzle tube 2 by a passage 34, and the nozzle tube comprises a number of openings 38 so disposed as to be situated in the chamber 36 when the nozzle tube is moved to its operative position. The valve has its stem 40 guided in a stuffing box 42, and the end of the valve stem 40 is carried through an abutment sleeve 46 attached to the apparatus casing 6 by the bolt 46'.

The operating mechanism is coupled to the valve by a motion transmitting connection which causes the opening and the closing of the valve to be in a definite relation to the motion of the nozzle. By rotating the hand-wheel 8 in one direction the nozzle tube is moved from the inoperative to the operative position and in or approximately in this position the valve is opened and the cleaning fluid passes to the nozzle. The continuous rotation of the hand-wheel 8 turns the nozzle 2 through a certain angle in one direction. When the hand-wheel is rotated in the opposite direction, the nozzle tube is rotated back through the same angle during continued blowing of the cleaning fluid. In the initial angular position the valve is closed whereupon the nozzle is returned axially to the inoperative position.

The motion transmitting connection includes a gear wheel 12 driven by the gear wheel 10 upon operation of the hand-wheel 8, and meshes with a gear wheel 48 mounted on one end of a control screw 50. Releasable clamping means in the form of tongs 54 is mounted upon and driven by the screw 50 and provides a detachable coupling for connecting the valve to the operating mechanism. The tongs 54 comprises a threaded sleeve 52 surrounding the control screw, and a pair of tong jaws 54 pivotally mounted in one end of the sleeve and each having one end thereof actuated by a spring 56 in such a manner that the other end is caused to engage a shoulder or flange 58 at one end of the valve stem, said flange being held against the member 60 on the sleeve 52 through which the valve stem is carried slidably.

When the nozzle is in its operative position, the valve is opened, i. e., occupies the position illustrated in Fig. 1. In this position it is held by the tong jaws 52, 54. On rotation of the hand-wheel 8 for returning the nozzle tube to the inoperative position, the control screw 50 is turned by means of the gear-wheels 12 and 48, the tong sleeve, which is prevented from rotating by being guided in the stationary abutment sleeve 46, being moved to the left, as seen in Figure 1, and carrying with it the valve stem 40, and also the shoulder 58, which is coupled to the tong sleeve by the tong jaws. Immediately before the valve 32 reaches the valve seat 30 at the end of this movement, the tong jaws 54 abut the rear end of the sleeve 46 whereby the engaging ends of the tong jaws are forced apart against the action of the springs 56 so as to release the valve stem. The sleeve 46 constitutes an abutment or means in the path of the jaws 54 for actuating the same. The tong sleeve then continues its movement independently of the valve. The latter is actuated, however, by the pressure from the cleaning fluid so that the valve is closed completely and is then kept closed by the pressure of the cleaning fluid.

When the nozzle is advanced to its operative position which is effected by the rotation of the hand-wheel 8 in the opposite direction to that for returning the nozzle to its inoperative position, the tong sleeve 52 is displaced in the direction from the valve seat but the valve is still closed until the bottom 60 of the tong sleeve abuts the shoulder 58. This occurs immediately before the nozzle reaches its operative position. The cleaning fluid can thereafter be introduced into the nozzle tube through the passage 34 and the openings 38 and flow further to the nozzle.

By disconnecting the valve in said manner from the tong sleeve immediately before the engagement of the valve seat the valve is prevented from becoming engaged with the valve seat in an inappropriate manner.

It may be conceived that if a vacuum arises in the inlet conduit after interrupting the steam supply, the same could again open the valve to the same degree as stated before. To prevent this and, at all events, to keep the valve in the closed position, the tong sleeve 52 can be formed as shown in Fig. 4. According to this embodiment the sleeve 52 has an inner shoulder 61 which in the closed position of the valve presses the flange 58 towards the valve seat 30 and thus holds the valve in its closed position.

By the described mechanism it will be seen that the cleaning fluid is supplied at the right moment relatively to the movement of the nozzle.

What we claim is:

1. In a soot blower the combination with a casing for receiving a cleaning fluid, and a nozzle tube mounted on said casing and movable relatively thereto, of an operating mechanism for moving the nozzle tube axially between an inoperative and an operative position as well as for rotating said tube in the latter position, a valve comprising a seat and a valve member movable toward and away from said seat for the control of the supply of cleaning fluid to the nozzle tube and a motion transmitting connection between the operating mechanism and the valve, said connection including tongs for positive cooperation with the valve member means to move said tongs, and abutting means disposed in the path of motion of said tongs to be engaged thereby to open the tongs and release the valve member before the moment at which the valve is set to completely engage the valve seat.

2. In a soot blower the combination with a casing for receiving a cleaning fluid, and a nozzle tube extended into said casing and movable relatively thereto, of an operating mechanism for moving the nozzle tube axially between an inoperative and an operative position as well as for rotating said tube in the latter position, a valve comprising a valve housing connected to said casing, a seat and a valve body for cooperation with said seat to control the flow of the cleaning fluid to the nozzle tube said valve being disposed outside the nozzle tube and movable longitudinally thereof, a releasable coupling between the operating member and the valve, the side of the valve body turned away from the seat being exposed to the pressure of the cleaning fluid whereby the valve body is moved to the seat by the influence of said pressure after the valve has been released from its connection with the operating mechanism.

3. A soot blower as claimed in claim 1 and further characterized by the fact that the connection comprises a shoulder to abut the valve stem after the valve body has been brought into contact with the valve seat and to prevent opening of the valve as a result of vacuum occurring in the supply conduit of the cleaning fluid.

4. In a soot blower the combination with a casing for receiving a cleaning fluid, a nozzle tube extended into said casing and movable relatively thereto, an operating mechanism for moving the nozzle tube axially between an inoperative and an operative position as well as for rotating said tube in the latter position, a valve carried by the casing and having a valve stem extending in the longitudinal direction of the nozzle tube outside said tube for the control of the supply of cleaning fluid thereto, and a motion transmitting connection between the operating mechanism and the valve stem, said connection including tongs for cooperation with the valve stem, an abutment for cooperating with the tong, and a nut and screw connection driven by the operating mechanism for displacing said tongs to engage said abutment and thereby to cause them to grip the valve stem to set the valve positively for controlling the supply of cleaning fluid to the nozzle tube.

5. In a soot blower the combination of a casing for receiving a cleaning fluid, a nozzle tube movably connected to said casing, operating mechanism for moving the nozzle tube axially between an inoperative and an operative position as well as for rotating said tube, a valve carried by said casing and provided with a valve stem, said valve being positioned outside of said casing for controlling the supply of cleaning fluid to the nozzle tube, and a motion transmitting connection between the operating mechanism and the valve, said connection including tongs releasably connected to the operating mechanism and to said tongs for displacing the tongs relative to the valve stem.

6. In a soot blower as claimed in claim 5 in which a fixed sleeve is positioned in the path of the tongs for controlling the connection of the latter with the valve stem.

THURE GUSTAF HÖGLUND.
GUSTAV EMANUEL LEIJON.